United States Patent [19]
Furumiya

[11] Patent Number: 5,387,944
[45] Date of Patent: Feb. 7, 1995

[54] VIDEO SIGNAL PROCESSING APPARATUS HAVING DIGITAL MULTIVALUE SYNCHRONIZING SIGNAL GENERATING CIRCUIT

[75] Inventor: Shigeru Furumiya, Katano, Japan

[73] Assignee: Matsushita Electric Industrial Co., Ltd., Osaka, Japan

[21] Appl. No.: 70,792

[22] Filed: Jun. 3, 1993

[30] Foreign Application Priority Data

Jun. 3, 1992 [JP] Japan .................................. 4-142477

[51] Int. Cl.⁶ .............................................. H04N 5/06
[52] U.S. Cl. ..................................... 348/521; 348/524
[58] Field of Search ............... 358/150, 152, 148, 153, 358/149, 154; H04N 5/06, 5/04; 348/521, 522, 523, 524

[56] References Cited

U.S. PATENT DOCUMENTS

| | | | |
|---|---|---|---|
| 4,723,164 | 2/1988 | Nienaber | 358/148 |
| 4,864,400 | 9/1989 | Kumada et al. | 358/150 |
| 5,012,340 | 4/1991 | Kirschenstein | 358/150 |

FOREIGN PATENT DOCUMENTS 2224907  5/1990  United Kingdom ............ H04N 5/6

OTHER PUBLICATIONS

"Broadcasting Technology Association Standard BTA-S-001", Aug. 1987.

*Primary Examiner*—Victor R. Kostak
*Assistant Examiner*—Michael H. Lee
*Attorney, Agent, or Firm*—Wenderoth, Lind & Ponack

[57] ABSTRACT

A digital multivalue synchronizing signal generating circuit generates three-value synchronizing signals for one frame using an address counter operating by a clock frequency which is more than 50 times the horizontal frequency and a ROM, and the three-value synchronizing signals are limited in band by a digital filter operating by the sampling clock of the digital video signal, and a digital multivalue synchronizing signal is generated. The video signal processing apparatus possessing a digital multivalue synchronizing signal generating circuit combines the digital video signal and digital multivalue synchronizing signal digitally, and produces a video signal having a digital synchronizing signal, and by D/A conversion thereof, a video signal having a analog synchronizing signal without waveform deterioration in the synchronizing signal portion is obtained.

11 Claims, 7 Drawing Sheets

VIDEO SIGNAL PROCESSING APPARATUS HAVING DIGITAL MULTIVALUE SYNCHRONIZING SIGNAL GENERATING CIRCUIT

BACKGROUND OF THE INVENTION

1. Field of the Invention

The present invention relates to a video signal processing apparatus having a digital multivalue synchronizing signal generating circuit, used for the purpose of obtaining a video signal having a analog synchronizing signal in high definition television systems.

2. Description of the Prior Art

The Hi-Vision system is known as one of the high definition television systems. In the Hi-Vision system, aside from digital signal processing within the system, connection of systems may be achieved by transmission of analog video signal. Among the analog video signal, in the wide band signal called the base band signal, three signals, Y (luminance signal), PB (color difference signal) and PR (color difference signal), or three signals, G (green signal), B (blue signal) and R (red signal), are used. Further, generally, three-value synchronizing signals of both positive and negative polarity are added to these analog video signals (reference: Broadcasting Technology Association Standard BTAS-001, August 1987).

Figure 5:
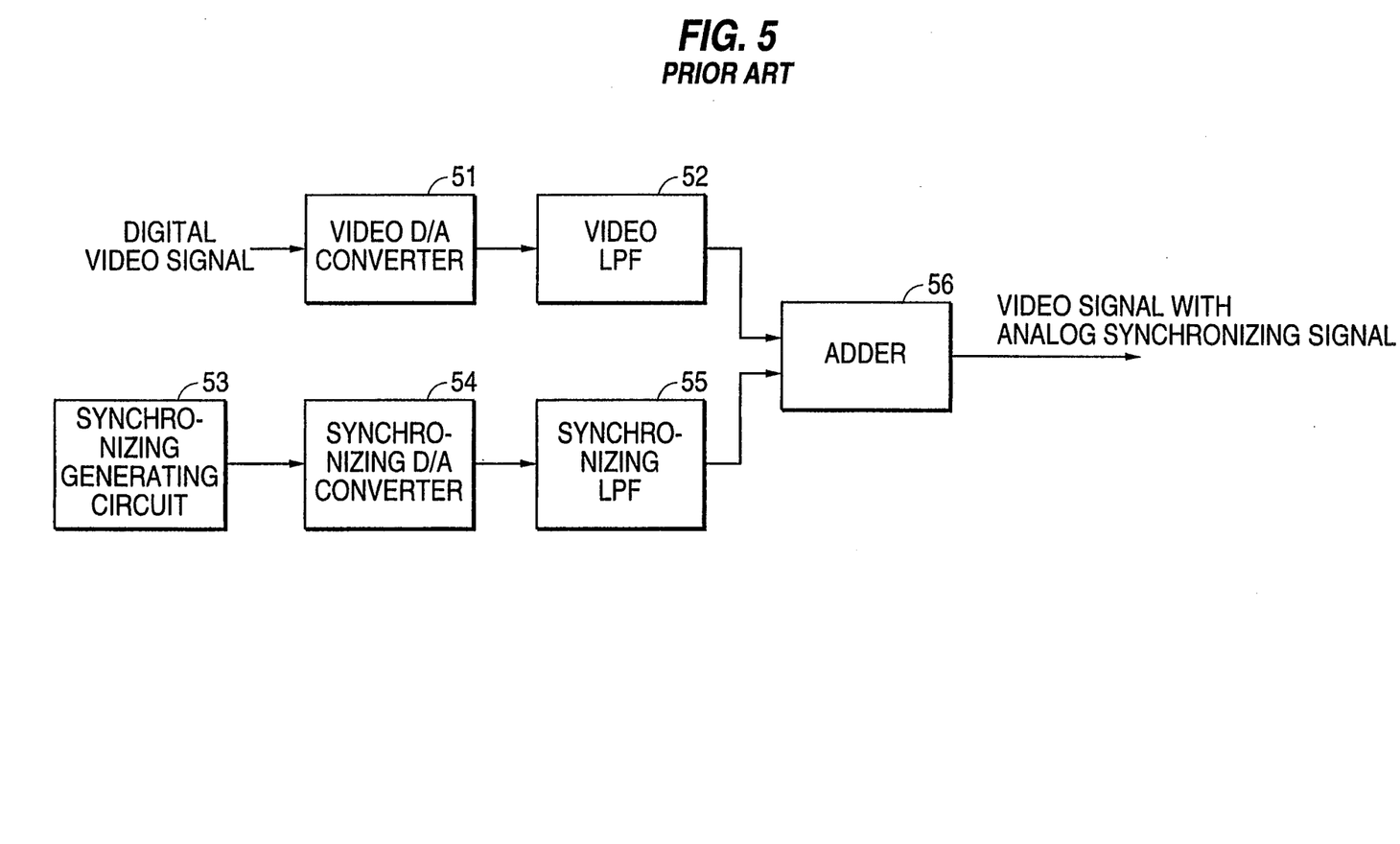
FIG. 5 is a block diagram of a conventional video signal processing apparatus.

In the conventional system, as shown in FIG. 5, a digital video signal is converted into an analog video signal by a video D/A converter 51 and a video LPF (low pass filter) 52, and a digital synchronizing signal generated in a synchronizing signal generator 53 is converted into an analog synchronizing signal in a synchronizing D/A converter 54, filtered In a synchronizing LPF 55, and added by analog signal processing in an adder 56, and a video signal with an analog synchronizing signal is obtained.

Today's signal processing systems require a reduced size and higher performance making circuit, digitization and integration necessary. In the case of The Hi-Vision system in which signal processing within the system is digital, digitization is also desired in the signal processing unit for adding a synchronizing signal to the video signal. It is hence considered to obtain a video signal having a digital synchronizing signal by combining a digital video signal and a digital synchronizing signal, and to convert the same into a video signal having an analog synchronizing signal using a single D/A converter, and filtered using a single LPF.

This LPF must have a flat characteristic in order to prevent damping of the video signal In the passing band and a steep damping characteristic for removing higher harmonics in the blocking band. The digital synchronizing signal generated in a conventional synchronizing signal generator has an infinite frequency band theoretically. Therefore, when a digital video signal and the conventional digital synchronizing signal are directly combined and D/A converted, and the video signal is limited in band by using a proper LPF, a transient response called ringing occurs in the synchronizing signal portion. In order to obtain a smooth synchronizing signal waveform by improving ringing, it is necessary to use a digital multivalue synchronizing signal having an equivalent frequency band to the digital video signal. A large number of memories is required for generating one frame portion of c digital multivalue synchronizing signal having an equivalent frequency band to the digital video signal, making it difficult to realize such a circuit.

SUMMARY OF THE INVENTION

It is a primary object of the present invention to provide a video signal processing apparatus for generating a video signal having an analog synchronizing signal without waveform deterioration.

To achieve the object, a video signal processing apparatus according to the present invention comprises digital multivalue synchronizing signal generating means for generating a digital multivalue synchronizing signal having an equivalent frequency band to a digital video signal, synchronizing means for combining the digital video signal and digital multivalue synchronizing signal to obtain a video signal having a digital synchronizing signal, D/A converting means for converting the video signal having the digital synchronizing signal into a video signal having an analog synchronizing signal, and clock generating means for generating an operation clock and a control signal for the digital multivalue synchronizing signal generating means and the synchronizing means.

In a preferred embodiment of the video signal processing apparatus of the present invention, the digital multivalue synchronizing signal generating means comprises three-value synchronizing signal generating means for generating a three-value synchronizing signal for one frame, and band limiting means for converting the three-value synchronizing signal into a digital multivalue synchronizing signal having an equivalent frequency band to the digital video signal.

In a further preferred embodiment of the video signal processing apparatus of the present Invention, the digital multivalue synchronizing signal generating means comprises a first counter for counting clocks at frequency of at least 50 times the horizontal frequency of the video signal and generating first addresses repeated in frame period, a ROM for reading three values depending on the first addresses and generating a three-value synchronizing signal for one frame, and a digital filter for limiting in band the three-value synchronizing signal into a digital multivalue synchronizing signal having an equivalent frequency band to the digital video signal by operation using the same sampling clock as the digital video signal.

In this constitution, the video signal processing apparatus of the present invention is based on digital signal processing, and hence the integration of the Hi-Vision system in which signal processing is digital may be promoted, and it is effective for downsizing the system and enhancing the performance.

BRIEF DESCRIPTION OF THE DRAWINGS

FIG. 7 (a) is a signal waveform diagram showing a three-value synchronizing signal of line 1.

FIG. 7 (b) is a signal waveform diagram showing a digital multivalue synchronizing signal of line 1.

FIG. 7 (c) is a signal waveform diagram showing a replacement signal in the second embodiment.

FIG. 7 (d) is a signal waveform diagram showing a digital multivalue synchronizing signal of line 6.

DESCRIPTION OF THE PREFERRED EMBODIMENTS

Figure 6:
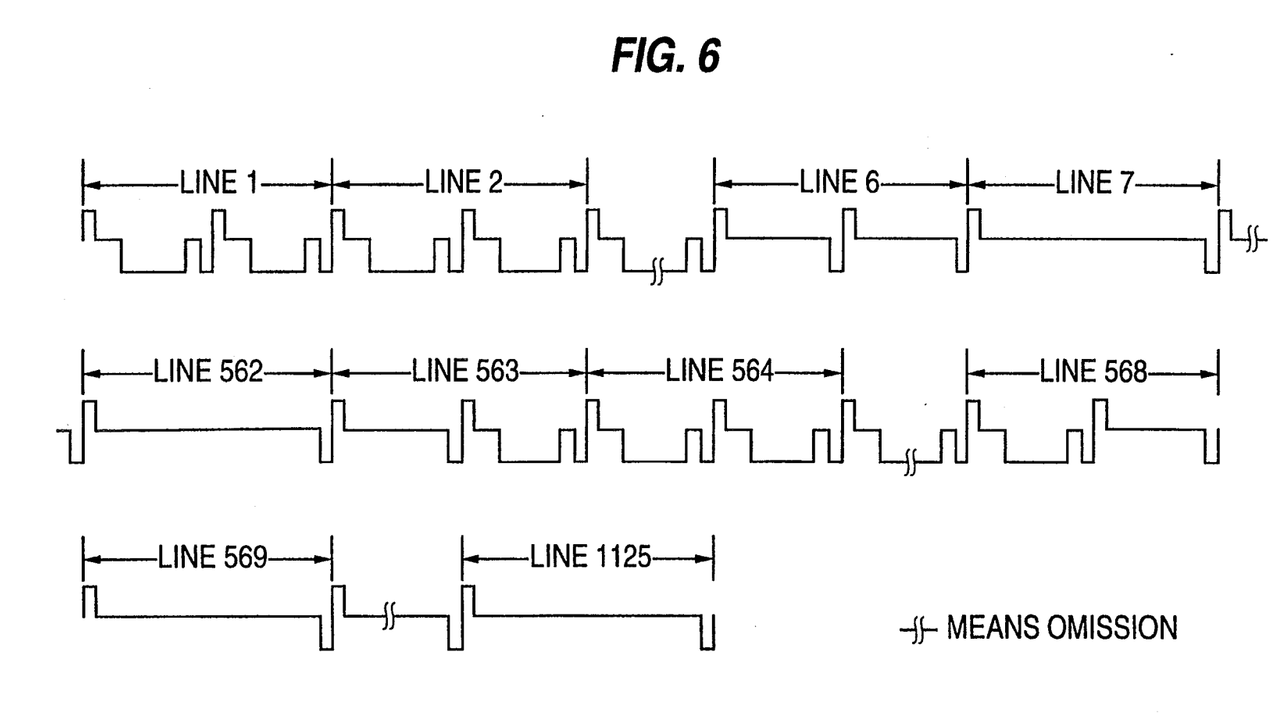
FIG. 6 is a signal waveform diagram for the portion of one frame of a three-value synchronizing signal of positive and negative polarity.

Two of the embodiments of the video signal processing apparatus of the present invention are described in detail below while referring to drawings. In the embodiments, Hi-Vision signals are handled, and the input signals are digital video signals, a 74.25 MHz sampling clock, and a reset signal which occurs once In every frame, while the output signals are video signals having an analog synchronizing signal which is a three-value synchronizing signal of positive and negative polarity. The horizontal frequency is 33.75 kHz, and one frame is 1125 lines. An outline of the signal waveform of the three-value synchronizing signal of positive and negative polarity of one frame is shown in FIG. 6.

Figure 1:
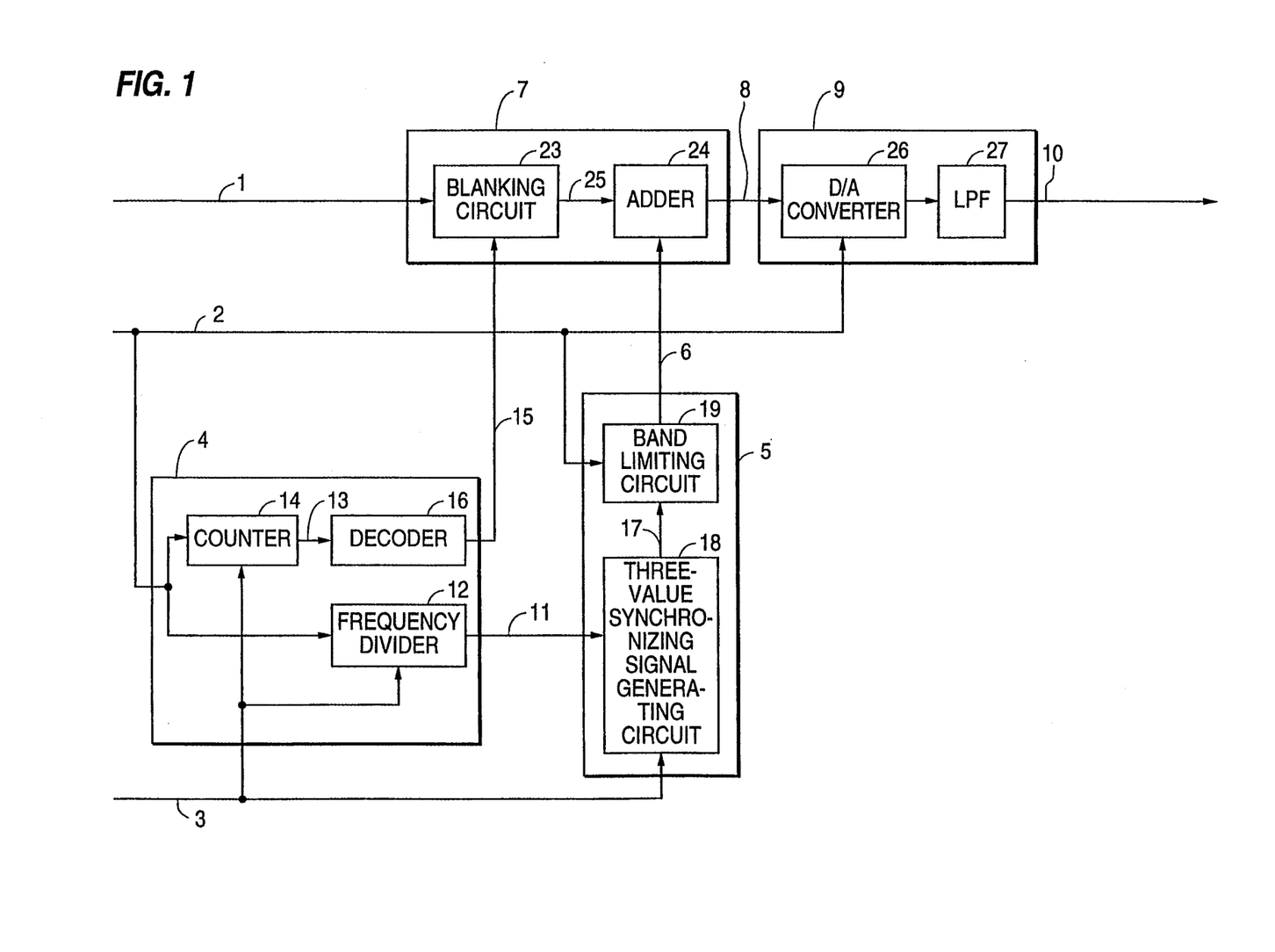
FIG. 1 is a block diagram of a first embodiment of video signal processing apparatus of the present invention.

FIG. 1 is a block diagram of a video signal processing apparatus of the first embodiment. In FIG. 1, numeral 1 denotes a digital video signal, 2 is a sampling clock, 3 is a reset signal, 4 is a clock generating circuit, 5 is a digital multivalue synchronizing signal generating circuit, 6 is a digital multivalue synchronizing signal, 7 is a synchronizing circuit, 8 is a video signal having a digital synchronizing signal, 9 is a D/A converting circuit, and 10 is a video signal having a analog synchronizing signal.

The clock generating circuit 4 is composed of a frequency divider 12 for generating a clock 11 to be used in the digital multivalue synchronizing signal generating circuit 5 by dividing the frequency of the sampling clock 2, a counter 14 for counting the sampling clocks 2 to generate an address 13, and a decoder 16 for decoding the address for generating a blanking signal 15 for use in the synchronizing circuit 7. The frequency divider 12 and counter 14 are reset once in every frame by the reset signal 3.

The digital multivalue synchronizing signal generating circuit 5 is composed of a three-value synchronizing signal generating circuit 18 for generating a three-value synchronizing signal 17 for one frame, and a band limiting circuit 19 for converting the three-value synchronizing signal 17 into a digital multivalue synchronizing signal 6 having a frequency band equivalent to the digital video signal 1.

Figure 2:
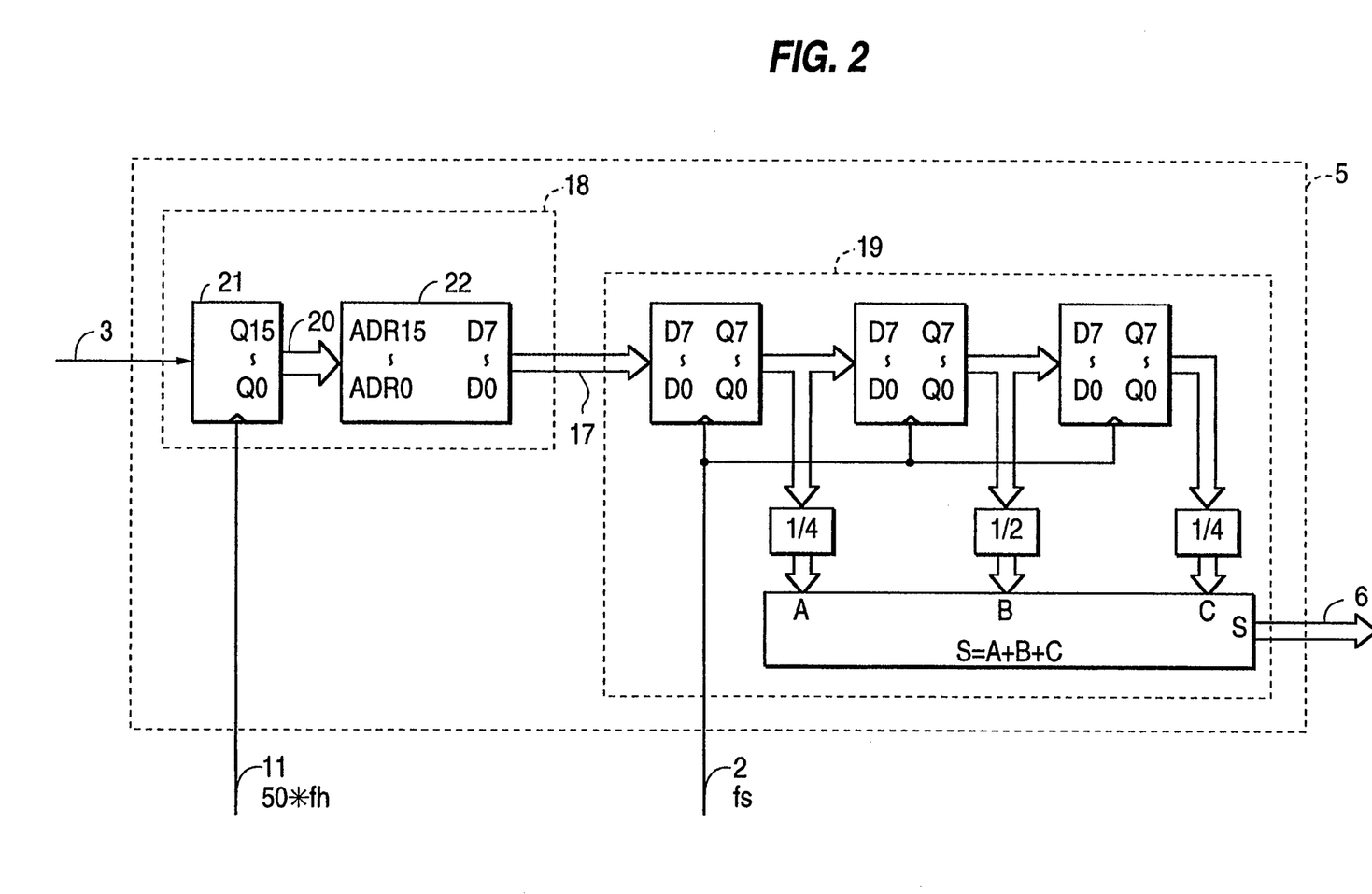
FIG. 2 is a circuit diagram of a digital multivalue synchronizing signal generating circuit in the first embodiment.
Figure 7A:
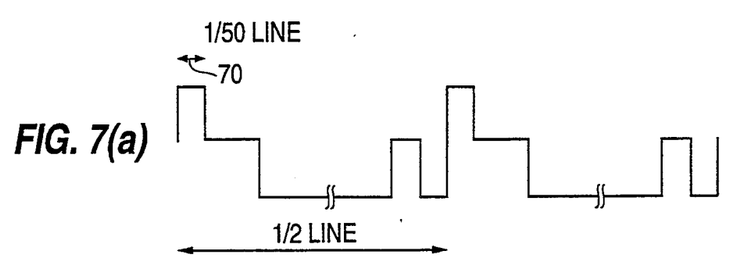

As a further practical example of the digital multivalue synchronizing signal generating circuit 5, a digital multivalue synchronizing signal generating circuit Is shown in FIG. 2. In FIG. 2, a three-value synchronizing signal generating circuit 18 is composed of a first counter 21 for counting the clocks 11 at a frequency at least 50 times the horizontal frequency of the video signal and being reset by the reset signal to generate a first address 20 in a frame period, and a ROM 22 for reading the value depending on the first address 20 and generating the three-value synchronizing signal 17 for one frame. The signal waveform of the three-value synchronizing signal 17 of line 1 is shown in FIG. 7 (a). The required frequency of clock 11 Is determined from the narrowest portion 70 in FIG. 7 (a), and it is one-fiftieth of one line. Therefore, to generate a three-value synchronizing signal, a clock of more than 50 times the horizontal frequency is required, and the value for minimizing the number of bits of the first counter 21 and the capacity of the ROM 22 is 50 times the horizontal frequency, that is, 1.6875 MHz is most appropriate. At this time, the first counter 21 counts the clocks 11 for one frame period, that is, 56250 times, and the first address 20 is 16 bits. The capacity of the ROM 22 is 512K bits supposing the output of the three-value synchronizing signal 17 to be 8 bits. As the internal structure of the ROM 22, In other method, after generating the three-value synchronizing signal In 2 bits, when converted into 8-bit amplitude, the required capacity is reduced to 128K bits.

Figure 7B:
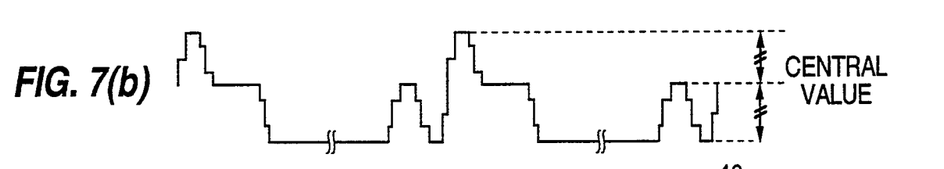

As the band limiting circuit, a digital filter 19 is used. The digital filter 19 limits the band by an operation using the same sampling clock 2 as the video signal, and converts the three-value synchronizing signal 17 into a digital multivalue synchronizing signal 6 having an equivalent frequency band to the digital video signal 1. The converted digital multivalue synchronizing signal 6 is shown in FIG. 7 (b). The number of taps and the constants used in the operation of the digital filter 19 in FIG. 2 are mere examples, and are not limitative.

More specifically, this digital multivalue synchronizing signal generating circuit generates, in the three-value synchronizing signal generating circuit 18, the three-value synchronizing signal 17 having an infinite frequency band for the portion of one frame, and limits it in band by the digital filter in the band limiting circuit 19, thereby obtaining a digital multivalue synchronizing signal 6. That is, by converting in band by the digital filter after generating the three-value synchronizing signal for one frame in the low speed ROM, digital multivalue synchronizing signals for one frame can be generated by a ROM of relatively small capacity, at a same signal rate as the digital video signals.

In FIG. 1, the synchronizing circuit 7 is composed of a blanking circuit 23 and an adder 24. The blanking circuit 23 replaces the blanking period without video data, out of the digital video signal 1, with a specified value by the blanking signal 15 generated by the clock generating circuit 4. The specified value is the black level when the digital video signal 1 is a luminance signal, and is the colorless level in the case of a color difference signal. The adder 24 adds the digital video signal 25 after blanking processing and the digital multivalue synchronizing signal 6 generated by the digital multivalue synchronizing signal generating circuit 5, and generates a video signal 8 having a digital synchronizing signal.

The D/A converting circuit 9 is composed of a D/A converter 26 and a low pass filter (LPF) 27. The D/A converter 26 converts the video signal having a digital synchronizing signal into an analog signal, and higher harmonics are removed in the LPF 27, and a smooth video signal having an analog synchronizing signal 10 is obtained. When both the digital video signal 1 and digital multivalue synchronizing signal 6 are 8 bits, the added video signal 8 having a digital synchronizing signal is 9 bits. Therefore, a D/A converter 26 of 9-bit specification is used. The LPF 27 must have a flat characteristic in the passing region and a steep damping characteristic in the blocking region in order not to impair the signal band of the video signal.

Figure 3:
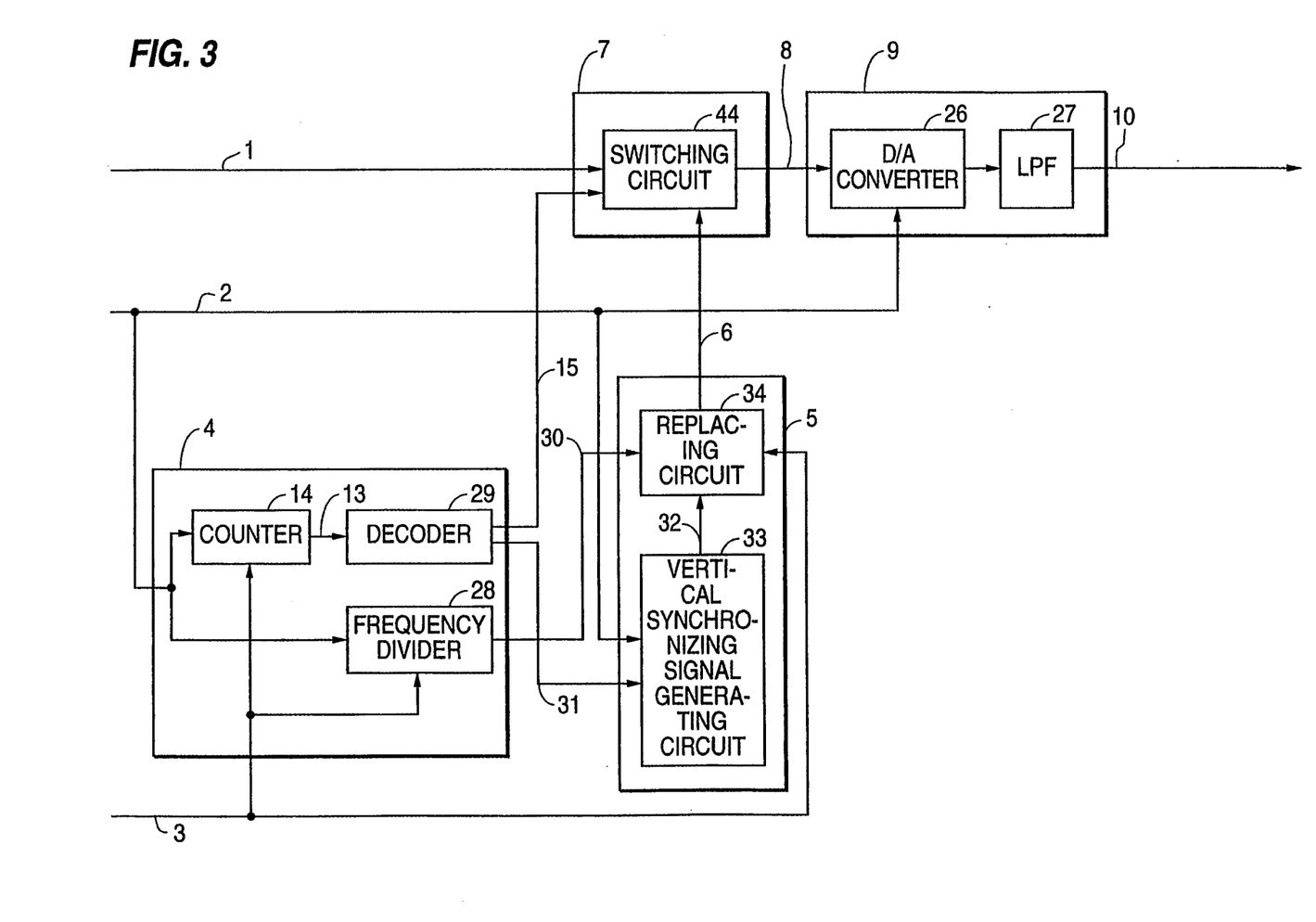
FIG. 3 is a block diagram of a second embodiment of video signal processing apparatus of the present invention.

A second embodiment of the present Invention is described below. FIG. 3 shows a block diagram of a video signal processing apparatus In the second embodiment. In FIG. 3, those components which are identified with the same reference numbers as in FIG. 1 of the first embodiment are equal In name and function, and their explanations are omitted herein. A frequency divider 28 generates a clock 30 which is used in the digital multivalue synchronizing signal generating circuit 5, by dividing the frequency of the sampling clock 2, but its frequency is half that of the clock 11 in the first embodiment. A decoder 29 generates a second reset signal 31 used in the digital multivalue synchronizing signal generating circuit 5, together with the blanking signal 15.

The digital multivalue synchronizing signal generating circuit 5 is composed of a vertical synchronizing signal generating circuit 33 for generating repetitively the portion of the vertical synchronizing signal 32 out of the digital multivalue synchronizing signal 6 having a frequency band equivalent to the digital video signal 1, and a replacing circuit 34 for replacing the level of the specified portion of the vertical synchronizing signal 32 with a central value.

Figure 4:
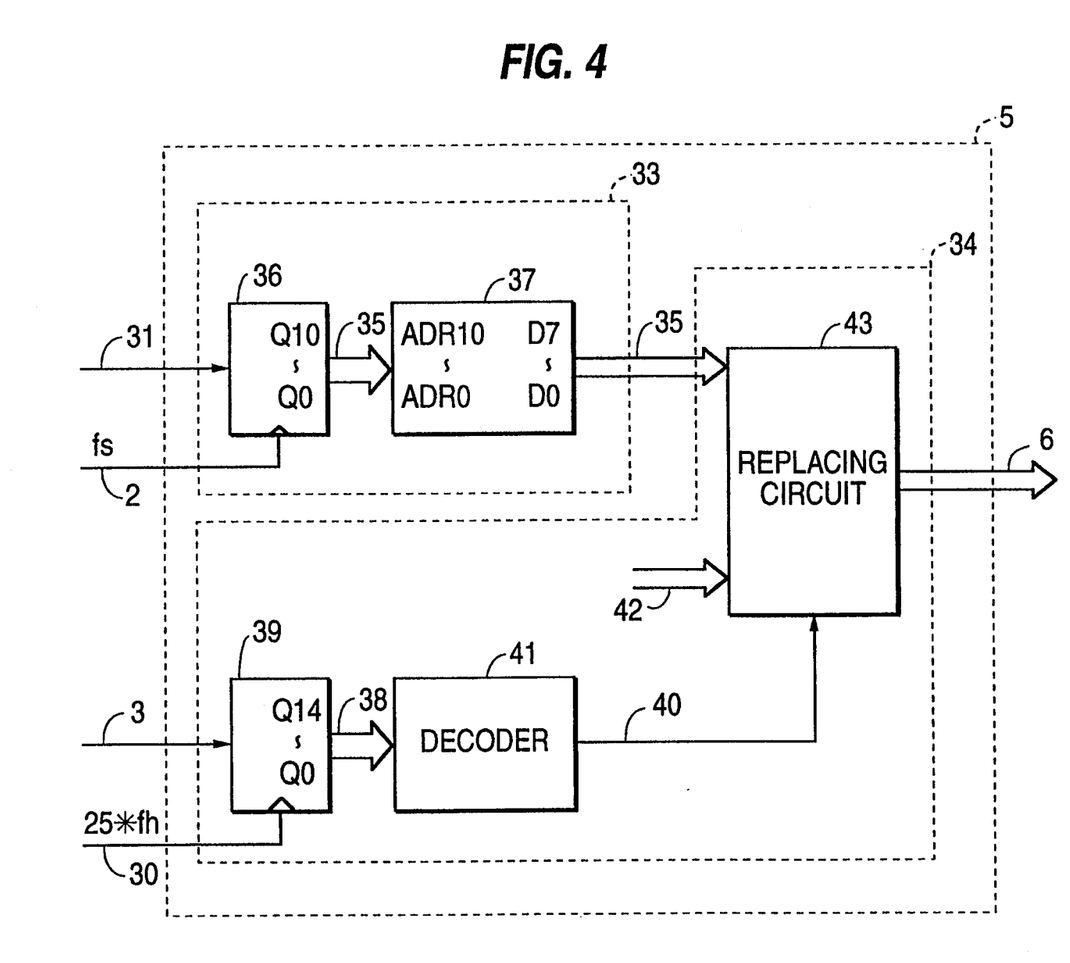
FIG. 4 is a circuit diagram of digital multivalue synchronizing signal generating circuit in the second embodiment.

As a further practical example of the digital multivalue synchronizing signal generating circuit 5, a digital multivalue synchronizing signal generating circuit is shown in FIG. 4. In FIG. 4, a vertical synchronizing signal generating circuit 33 is composed of a second counter which counts the sampling clocks 2, is reset by a second reset signal 31 repeated in the period of at least a half line, and generates a second address 35, and a ROM 37 which reads the value depending on the second address 35, and generates a multivalue vertical synchronizing signal 32 having a frequency band equivalent to the digital video signal 1 for at least a half line, corresponding to the second address 35. FIG. 7(b) shows a signal waveform diagram of the multivalue vertical synchronizing signal 36.

In the three-value synchronizing signal of positive and negative polarity shown in FIG. 6, since the minimum repeating unit with periodicity is the unit of a half line, the second counter 36 counts the sampling blocks 2 1100 times in the period of a half line, that is, at 74.25 MHz, by the second reset signal 31 once in every half line, thereby obtaining the second address 35 of 11 bits. The ROM 37 is accessed by the second address 35, and the half line portion of the vertical synchronizing signal portion of the digital multivalue synchronizing signal preliminarily limited in band is produced repeatedly. Supposing the number of output bits of the ROM 37 to be 8 bits, a capacity of 16K bits is enough. Incidentally, the three-value synchronizing signal of positive and negative polarity in the period of one frame has five patterns in the unit of one line as shown in FIG. 6. That is, the signal is classified by whether the first half and second half of one line are vertical synchronizing signal or a central value of three values, such as line 1, line 6, line 7, line 563, and line 568. Therefore, by replacing the specified portion of the vertical synchronizing signal 32 with a central value, digital multivalue synchronizing signals of all lines can be obtained.

Accordingly, the replacing circuit 34 is composed of a third counter 39 for counting clocks 30 at frequency of at least 25 times the horizontal frequency of the video signal, and generating a third address 38 repeated in a period of a frame by a reset signal 3 once in every frame, a decoder 41 for decoding the third address 38 to generate a replacement signal 40, and a replacing circuit 43 for replacing the specified portion of the vertical synchronizing signal 32 with a central value 42 of the multivalue synchronizing signal by using the replacement signal 40. The timing of the replacement signal 40 should be preferably less than two times the width of the horizontal synchronizing signal portion in order to replace the horizontal synchronizing portion and vertical synchronizing portion efficiently with the central value. That is, since the width of the horizontal synchronizing signal portion is one-fiftieth of one line, the frequency of the clock 30 is required to be 25 times or more of the horizontal frequency. When the frequency of the clock 30 is 25 times the horizontal frequency, that is, at 843.75 kHz, the number of bits of the third counter 39 and decoder 41 may be minimized. At this time, the third counter 39 counts the clocks 30 in the period of one frame, that is, 28125 counts, and the third address 38 becomes 15 bits.

Figure 7C:
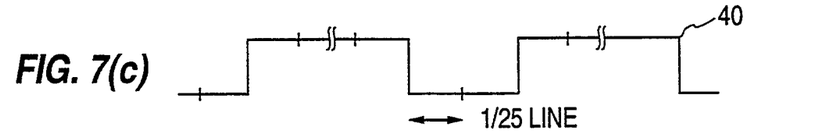
Figure 7D:
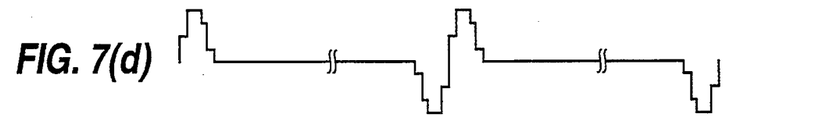

The operation of the replacing circuit 43 is explained by reference to FIG. 7. For example, the replacement signal 40 is produced as shown in FIG. 7 (c) to the vertical synchronizing signal 32 In FIG. 7 (b) to obtain the digital multivalue synchronizing signal 6 as shown in FIG. 7 (d). Likewise, synchronizing signals of all lines can be obtained.

That is, this digital synchronizing signal generating circuit continuously generates multivalue vertical synchronizing signals for a half line in the vertical synchronizing signal generating circuit 33, and replaces the level of the specified portion with the central value In the replacing circuit 34, thereby generating digital multivalue synchronizing signals 6 of all lines. More specifically, by a high speed ROM of relatively small capacity, only the vertical synchronizing portions preliminarily limited in band are generated continuously, and are converted into synchronizing signals of all lines In the replacing circuit, so that digital multivalue synchronizing signals for one frame can be generated in a relatively small circuit at a signal rate which is the same as the digital video signals.

In FIG. 3, the synchronizing circuit 7 comprises a switching circuit 44 which generates a video signal 8 having a digital synchronizing signal by replacing the blanking period without video data with the digital multivalue synchronizing circuit 6, out of the digital video signal 1, by the blanking signal 15 generated by the clock generating circuit 4.

Hereinafter, as in the first embodiment, a smooth video signal having an analog synchronizing signal is obtained by the D/A converting circuit 9. When the input digital video signal 1 is a color difference signal, or when the maximum amplitude is small if It is a luminance signal, the video signal 8 having a digital synchronizing signal obtained in the switching circuit 44 can be processed in the same number of bits as in the case of the input. For example, if the digital video signal 1 is 8 bits, the video signal 8 having a digital synchronizing signal is also 8 bits, and the D/A converter 26 may be also of 8-bit specification.

In this constitution and operation, the video signal processing apparatus of the first embodiment and second embodiment of the present invention digitally combines a digital multivalue synchronizing signal together with the input digital video signal. In spite of processing of the video signal having a digital synchronizing signal by the D/A converter and LPF for video signals, since the band-limited synchronizing signal is used, the signal quality of the video signal does not deteriorate, and at the synchronizing signal portion transient response such as ringing does not occur.

In the foregoing embodiments, the frequency of the sampling clock was 74.25 MHz, but this is not limitative, and the invention can be applied directly in other frequencies by changing the number of bits of the counter and ROM. The digital multivalue synchronizing signal generating circuit and synchronizing circuit In the first and the second embodiments are composed differently, but they may be also composed in reverse combination.

What is claimed is:

1. A video signal processing apparatus comprising:
   digital multivalue synchronizing signal generating means for generating a digital multivalue synchronizing signal having an equivalent frequency band to a digital video signal;
   synchronizing means for combining the digital video signal and the digital multivalue synchronizing signal to obtain a first video signal having a digital synchronizing signal;
   digital/analog converting means for converting the first video signal having the digital synchronizing signal into a second video signal having an analog synchronizing signal; and
   clock generating means for generating an operation clock and a control signal for the digital multivalue synchronizing signal generating means and the synchronizing means.

2. A video signal processing apparatus of claim 1, wherein the digital multivalue synchronizing signal generating means comprises
   three-value synchronizing signal generating means for generating a three-value synchronizing signal for one frame, and
   band limiting means for converting the three-value synchronizing signal into the digital multivalue synchronizing signal having an equivalent frequency band to the digital video signal.

3. A video signal processing apparatus of claim 1, wherein the digital multivalue synchronizing signal generating means comprises
   a first counter for counting a clock signal having a frequency of at least 50 times a horizontal frequency of the digital video signal and generating first addresses repeated in a frame period,
   a read only memory for reading three values according to the first addresses and generating a three-value synchronizing signal for one frame, and
   a digital filter for limiting in band the three-value synchronizing signal into the digital multivalue synchronizing signal having an equivalent frequency band to the digital video signal using a same sampling clock as the digital video signal.

4. A video signal processing apparatus of claim 1, wherein the digital multivalue synchronizing signal generating means comprises
   vertical synchronizing signal generating means for repetitively generating a portion of a vertical synchronizing signal out of the digital multivalue synchronizing signal having a frequency band equivalent to the digital video signal, and
   replacing means for replacing a specified portion of the vertical synchronizing signal with a central value of the digital multivalue synchronizing signal.

5. A video signal processing apparatus of claim 1, wherein the digital multivalue synchronizing signal generating means comprises
   a first counter for counting sampling clocks of the digital video signal and generating a first address repeated in a period of at least a half line,
   a read only memory for generating, according to the first address, a multivalue vertical synchronizing signal having a frequency band equivalent to the digital video signal for at least a half line,
   a second counter for counting a clock signal having a frequency of at least 25 times a horizontal frequency of the digital video signal and generating a second address repeated in a period of a frame,
   a decoder for generating a replacement signal specifying a portion of the multivalue vertical synchronizing signal by decoding the second address, and
   a replacing circuit for replacing the portion of the multivalue vertical synchronizing signal specified by the replacement signal with a central value to obtain the digital multivalue synchronizing signal.

6. A video signal processing apparatus of claim 1, wherein the synchronizing means comprises
   a blanking circuit for replacing a blanking period without video data out of the digital video signal with a specified value using the control signal generated by the clock generating means, and
   an adder for adding the digital video signal having the blanking period replaced with the specified value and the digital multivalue synchronizing signal to generate the first video signal having a digital synchronizing signal.

7. A video signal processing apparatus of claim 1, wherein the synchronizing means comprises a switching circuit for replacing the digital video signal with the digital multivalue synchronizing signal according to the control signal generated by the clock generating means to generate the first video signal having a digital synchronizing signal.

8. A digital multivalue synchronizing signal generating circuit comprising:
   three-value synchronizing signal generating means for generating a three-value synchronizing signal for one frame; and
   band-limiting means for converting the three-value synchronizing signal into a digital multivalue synchronizing signal having a frequency band equivalent to a digital video signal.

9. A digital multivalue synchronizing signal generating circuit comprising:
   a first counter for counting a clock signal having a frequency of at least 50 times a horizontal frequency of a digital video signal and generating first addresses repeated in a frame period;
   a read only memory for reading three values according to the first addresses and generating a three-value synchronizing signal for one frame; and
   a digital filter for limiting in band the three-value synchronizing signal into a digital multivalue synchronizing signal having an equivalent frequency band to the digital video signal using a same sampling clock as the digital video signal.

10. A digital synchronizing signal generating circuit comprising:
    vertical synchronizing signal generating means for repetitively generating a portion of a vertical synchronizing signal out of a digital multivalue synchronizing signal having a frequency band equivalent to a digital video signal; and replacing means for replacing a specified portion of the vertical synchronizing signal with a central value of the digital multivalue synchronizing signal.

11. A digital multivalue synchronizing signal generating circuit comprising:

a first counter for counting sampling clocks of a digital video signal and generating a first address repeated in a period of at least a half line;

a read only memory for generating, according to the first address, a multivalue vertical synchronizing signal having a frequency band equivalent to the digital video signal for at least a half line;

a second counter for counting a clock signal having a frequency of at least 25 times a horizontal frequency of the digital video signal and generating a second address repeated in a period of a frame;

a decoder for generating a replacement signal specifying a portion of the multivalue vertical synchronizing signal by decoding the second address; and a replacing circuit for replacing the portion of the multivalue vertical synchronizing signal specified by the replacement signal with a central value to obtain the digital multivalue synchronizing signal.

* * * * *